United States Patent
Bi et al.

(10) Patent No.: US 10,553,869 B2
(45) Date of Patent: Feb. 4, 2020

(54) LITHIUM BATTERY CATHODE

(71) Applicant: Honda Motor Co., Ltd., Tokyo (JP)

(72) Inventors: Wu Bi, Southfield, MI (US); Christian Fau, Marysville, OH (US); Wentian Gu, Atlanta, GA (US); Alice Yue Hou, Ann Arbor, MI (US)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 15/102,844

(22) PCT Filed: Dec. 9, 2014

(86) PCT No.: PCT/US2014/069325
§ 371 (c)(1),
(2) Date: Jun. 8, 2016

(87) PCT Pub. No.: WO2015/089060
PCT Pub. Date: Jun. 18, 2015

(65) Prior Publication Data
US 2016/0308206 A1    Oct. 20, 2016

Related U.S. Application Data

(60) Provisional application No. 61/913,664, filed on Dec. 9, 2013.

(51) Int. Cl.
*H01M 4/505* (2010.01)
*H01M 4/525* (2010.01)
(Continued)

(52) U.S. Cl.
CPC ......... *H01M 4/505* (2013.01); *H01M 4/0471* (2013.01); *H01M 4/131* (2013.01);
(Continued)

(58) Field of Classification Search
CPC .............................. H01M 4/505; H01M 4/525
See application file for complete search history.

(56) References Cited

U.S. PATENT DOCUMENTS

2008/0248391 A1* 10/2008 Wakasugi .............. B82Y 30/00
429/223
2010/0099027 A1* 4/2010 Kikuya ................. H01M 4/366
429/223

(Continued)

FOREIGN PATENT DOCUMENTS

KR    1020060105211 A    10/2006

OTHER PUBLICATIONS

International Search Report and Written Opinion regarding International App. No. PCT/US2014/069325, dated Mar. 24, 2015, 11 pages.

(Continued)

*Primary Examiner* — Matthew J Merkling
(74) *Attorney, Agent, or Firm* — Armstrong Teasdale LLP

(57) ABSTRACT

A cathode material formed of a plurality of lithium inclusive particles. The particles have a core surrounded by a shell. The shell is characterized by a plurality of pores. Exemplary materials of which the particles are formed include NMC. The cathode material is suitable for use in a lithium-ion battery which has application in apparatus such as automotive vehicles.

18 Claims, 12 Drawing Sheets

(51) Int. Cl.
    *H01M 4/36*     (2006.01)
    *H01M 4/04*     (2006.01)
    *H01M 4/131*     (2010.01)
    *H01M 4/1391*     (2010.01)
    *H01M 4/62*     (2006.01)
    *H01M 10/0525*     (2010.01)
    *H01M 4/02*     (2006.01)

(52) U.S. Cl.
    CPC ......... *H01M 4/1391* (2013.01); *H01M 4/366* (2013.01); *H01M 4/525* (2013.01); *H01M 4/623* (2013.01); *H01M 4/625* (2013.01); *H01M 10/0525* (2013.01); *H01M 2004/028* (2013.01); *H01M 2220/20* (2013.01)

(56) References Cited

U.S. PATENT DOCUMENTS

| | | | | |
|---|---|---|---|---|
| 2010/0203388 A1* | 8/2010 | Kim | ...................... | H01M 4/364 429/223 |
| 2012/0261610 A1* | 10/2012 | Paulsen | ................. | H01M 4/131 252/182.1 |
| 2013/0078520 A1* | 3/2013 | Toya | ...................... | C01G 53/00 429/223 |
| 2013/0337327 A1* | 12/2013 | Sun | ...................... | H01M 4/0471 429/219 |

OTHER PUBLICATIONS

Yao, Yuanlu et al., "Synthesis and electrochemical performance of phosphate-coated porous LiNi1/3Co1/3Mn1/3O2 cathode material for lithium ion batteries," Electrochimica Acta, Oct. 6, 2013, vol. 113, pp. 340-345.

Lee, Ki-Soo et al., "Synthesis and electrochemical performances of core-shell structured Li[Ni1/3Co1/3Mn1/3)0.8 (Ni1/2Mn1/2)0.2]O2 cathode material for lithium ion batteries," Journal of Power Sources, Feb. 6, 2010, vol. 195, pp. 6043-6048.

Lin, Bin et al., "Morphology and electrochemical performance of Li[Ni1/3Co1/3Mn1/3]O2 cathode material by a slurry spray drying method," Journal of Power Sources, Sep. 22, 2007, vol. 175, pp. 564-569.

Huang, Zhen-Dong et al., "Microscopically porous, interconnected single crystal LiNi1/3Co1/3Mn1/3O2 cathode material for Lithium ion batteries," J. Mater. Chem., Jun. 16, 2011, vol. 21, pp. 10777-10784.

Liu, Xian-Ming et al., "Synthesis of LiNi1/3Co1/3Mn1/3O2 nanoparticles by modified Pechini method and their enhanced rate capability," J. Sol-Gel Sci. Technol., Sep. 22, 2011, vol. 61, pp. 56-61.

* cited by examiner

LITHIUM BATTERY CATHODE

CROSS-REFERENCE TO RELATED APPLICATIONS

This application is a National Stage Entry of International Application No. PCT/US2014/069325 filed Dec. 9, 2014, which claims priority to U.S. Provisional Application Ser. No. 61/913,664 filed Dec. 9, 2013, the disclosures of which are hereby incorporated by reference in their entirety.

BACKGROUND

The present exemplary embodiment relates to materials suitable for use in rechargeable lithium-ion batteries and cells and methods of their manufacture. The disclosure further relates to the lithium-ion battery itself. The disclosure also relates to a method of treating cathodic materials for use in batteries. However, it is to be appreciated that the present exemplary embodiment is also amenable to other similar applications that will be apparent to the skilled artisan.

Rechargeable lithium-ion battery technology is important to portable electronics and the development of advanced cathode materials is necessary to meet the requirements of various apparatus, such as personal computers, environment-friendly electric and hybrid cars, and stationary power sources compensating for power fluctuation that may be caused by natural phenomena that effect renewable energy sources like solar or wind power. Low cost and long life are particularly required in the field of large-scale lithium batteries.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a cathode material constituted from a plurality of lithium inclusive particles is provided. The particles have a core surrounded by a shell. The shell is characterized by a plurality of pores. Exemplary materials of which the particles are formed include NMC. The cathode material is suitable for use in a lithium-ion battery which has application in apparatus such as automotive vehicles.

According to a second embodiment, a method of treating a cathode material of a battery is provided. The method includes the step of exposing the cathode material in the form of particles to an acid solution for a time period sufficient to form a plurality of pores in a surface of the particles. Subsequent to the acid exposure, the particles are heat treated.

According to a third embodiment, a method of manufacturing a lithium battery is provided. A lithium compound material in the form of particles is exposed to an acid solution for a time period sufficient to form a plurality of pores in a surface of the particles. The acid treated particles are then heat treated and assembled as the cathode of a battery

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which.

DETAILED DESCRIPTION

Embodiments of the invention will be described hereinafter with reference to the accompanying drawings. In this detailed description reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Layered transition metal oxides having more than unit Li concentration ($Li[Li_{1-x-y}Me_xMn_y]O_2$, Me=Ni, Co, Fe, etc.; wherein x and y are between 0 and <1) are exemplary materials considered suitable as the cathode material of a lithium battery. The electrochemically active lithium component is able to reversibly intercalate and deintercalate and can deliver charges when it is cathodically polarized. Specific examples of lithium materials suitable as a source of lithium ions in lithium ion batteries include lithium cobalt oxide ($LiCoO_2$), lithium iron phosphate (LFP), lithium manganese oxide (LMO), lithium nickel manganese cobalt oxide (NMC), lithium nickel cobalt aluminum oxide (NCA) and lithium titanate (LTO). These compounds are referred to herein generally as lithium compound materials.

It has been determined that providing a lithium compound material with an increased surface area may advantageously improve performance.

Figure 1:
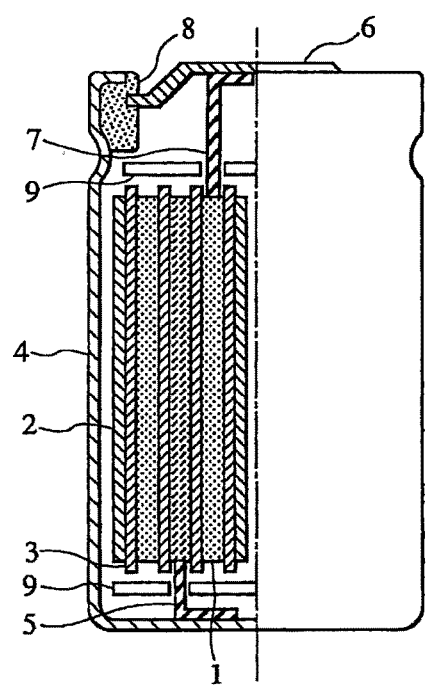
FIG. 1 is a schematic representation of a lithium-ion battery.

With reference to FIG. 1, a lithium ion battery having a cathode 1 and an anode 2 are provided with an intermediate separator 3. The cathode 1, the anode 2, and the separator 3 are wound and sealed together with a non-aqueous electrolyte into a battery can 4 made of stainless steel or aluminum. A positive lead 7 is formed at the cathode 1 and a negative lead 5 is formed at the anode 2 respectively, from which electric current is taken out. Insulation sheet 9 is formed between the cathode 1 and the negative lead 5, and between the anode 2 and the positive lead 7, respectively. A packing 8 is formed between the battery can 4 in contact with the negative lead 5 and a lid 6 in contact with the positive lead 7 for preventing leakage of the electrolyte and isolating the cathode and the anode.

The skilled artisan is well aware of the various electrolytes, separators, and anodes suitable for use within a lithium battery or cell, and the present disclosure is intended to encompass each of these alternatives. Accordingly, the following description of these elements is exemplary and not intended to be limiting.

The anode can be formed by coating the current collector comprising copper or the like with a negative electrode mix. The negative electrode mix has an active material, a conductive material, a binder, etc. For the active material metal lithium, a carbon material, or a material capable of intercalating lithium or forming a lithium compound can be used. The carbon material can include graphites such as natural graphites and artificial graphites and amorphous carbon, for example, carbides of coal type coke and coal type pitch, and carbides of petroleum type coke and petroleum type pitch, and carbides of pitch coke. Further, materials capable of intercalating lithium or forming a lithium compound include metals such as aluminum, tin, silicon, indium, gallium, and magnesium, alloys containing these elements, and metal oxides containing tin, silicon, etc. Further, composite materials of the metals, alloys, or metal oxides and carbon materials such as graphite type material or amorphous carbon can be used.

The electrolyte can be a lithium salt in an organic solvent. The electrolyte is typically a mixture of organic carbonates such as ethylene carbonate or diethyl carbonate containing complexes of lithium ions. These non-aqueous electrolytes generally use non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$) and lithium triflate ($LiCF_3SO_3$).

The separator layer can be formed of a polymer or a multilayer polymeric material. Exemplary materials include polypropylene, such as Celgard®2500 and similar commercially available materials.

The present disclosure is particularly focused on the cathode material. The cathode can be one or more of the lithium compound materials outlined above, or an alternative material known to the skilled artisan. The cathode is typically one of three lithium compound materials: a layered oxide (such as lithium cobalt oxide), a polyanion (such as lithium iron phosphate), or a spinel (such as lithium manganese oxide).

Typically the cathode is a mixture of lithium compound material particles, binders and electronically conducting additives. Exemplary binders include polyvinylidene fluoride (PVDF). Typically, electronic conducting additives include conductive carbon black, such as Timcal Super C65 and similar commercially available materials.

In operation, electrons and Li ions are transported through the various layers of battery materials. During battery discharge, Li ions de-intercalate from the anode, transport through the separator layer, and intercalate into active material in the cathode.

The present exemplary embodiment includes a treatment of the lithium compound material that improves performance and decreases the tendency of the cathode material to preferentially release lithium ions that decrease cell performance. The present embodiment contemplates the use of the lithium compound materials identified above and may have further applicability to lithium compound materials developed in the future. In fact, the present treatment method is not necessarily limited to a lithium ion based battery. Rather, it is envisioned to be relevant as applied to other battery types based on other ionic shuttles such as the Na, Mg, and F ion.

The present embodiment has particular relevance to these materials in their particle form. It may have particular advantages when used with a lithium manganese oxide or lithium nickel manganese cobalt oxide material.

Figure 2:
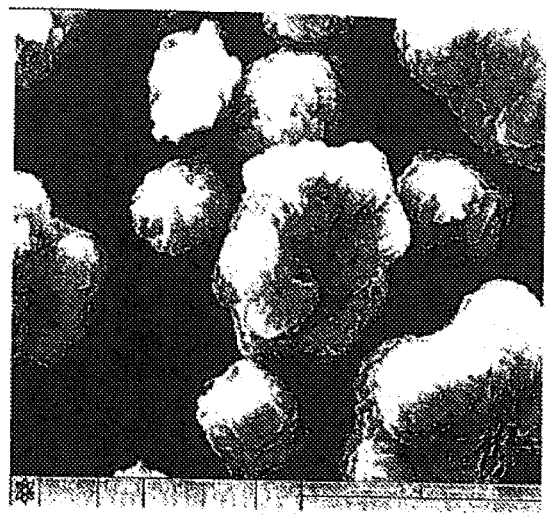
FIG. 2 is a photomicrograph of a NMC particle and agglomerated particles.

Exemplary NMC particles observed by scanning electron microscopy (SEM) are shown in FIG. 2. The photomicrograph shows that an individual NMC particle has a cylindrical shape and is about one micron in diameter. The photomicrograph also shows particles agglomerated into a generally spherical secondary particle with a size of about 5-10 microns. The lithium compound material particles are often in the form of secondary particles agglomerated from many primary particles. The agglomerated secondary particles include a plurality of internal pores formed between adjacent individual particles.

Figure 3:
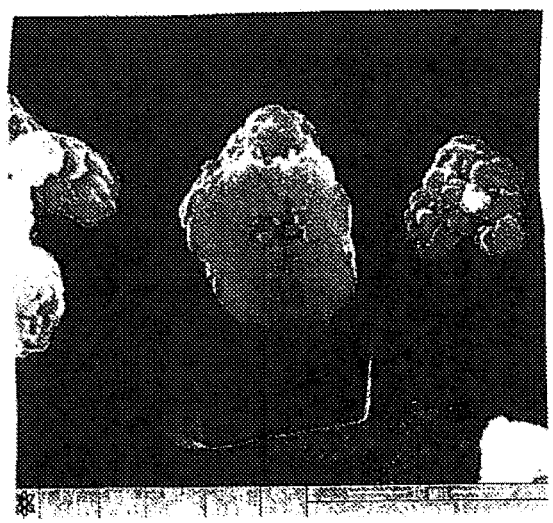
FIG. 3 is a photomicrograph of an agglomerated secondary particle cut by focused ion beam.

FIG. 3 shows an agglomerated secondary NMC particle cut generally in half using a focused ion beam. The cut agglomerated particle shows that pores exist within the secondary particles. Without being bound by theory, it is believed these pores allow improved primary particle wetting by the electrolyte within the secondary particle, which improves the rate of ion insertion and de-insertion and provides a corresponding improvement in battery power density.

According to an exemplary embodiment of the disclosure, it is believed that increasing the porosity of the particle surface can improve performance. To achieve this result, acid leaching and thermal treatment of the material particles is performed. This creates a porous and stable shell layer on the primary particle surface. The porous surface increases surface area enabling a faster rate of ion insertion or de-insertion while the untreated particle core preserves a high energy density and capacity of active material. This unique porous shell and solid core structure provides improved battery power density without sacrificing energy density.

Advantageously, acid leaching and heat treatment are inexpensive and scalable procedures. These procedures can also be executed during the original cathode compound material manufacturing to simplify the overall procedure and reduce the total manufacturing cost.

According to one embodiment, a commercially available lithium compound material powder, such as NMC, can be soaked in a dilute acid aqueous solution to provide a surface leaching treatment. Exemplary acids include HF, $H_2SO_4$, $HNO_3$, HCl or any mixtures thereof. The aqueous acid solution can have a molar mass of acid solute of greater than about 0.01M, or greater than about 1M. Soaking can be for a period from several minutes to several hours. For example, soaking time can range from more than about 10 minutes to less than about 24 hours, or more than about 1 hour to less than about 12 hours, or more than about 3 hours to less than about 5 hours. Each of these variables is result dependent and interrelated. Particularly, the stronger the acid and the higher the molarity, the less exposure time will be required.

Figure 4:
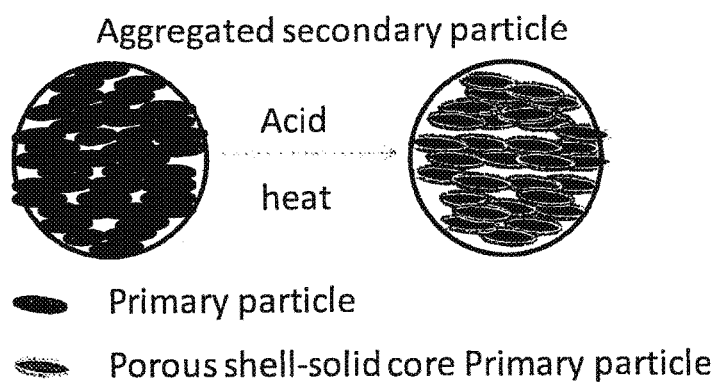
FIG. 4 is a schematic representation of an agglomerated particle before and after acid/heat treatment.
Figure 5:
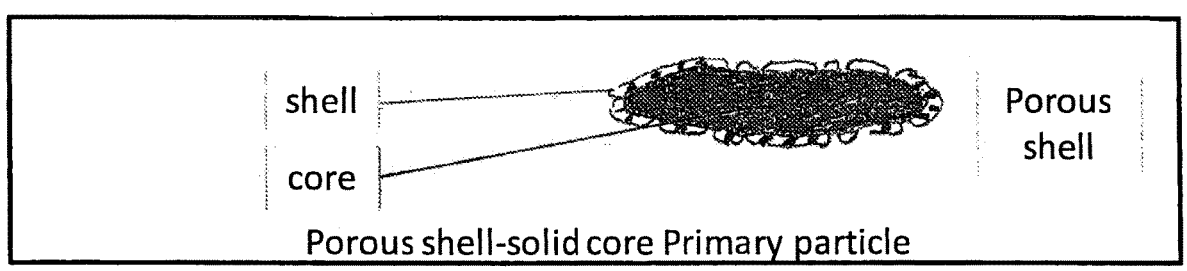
FIG. 5 is a schematic representative of an individual (primary) particle after acid/heat treatment.

In short, without being bound by theory, the objective of the acid leaching step is to remove matter allowing the electrolyte to better wet primary particles inside the agglomerated secondary particle, and also to form pores at the surface of the primary particle to create a porous shell layer surface as illustrated in FIG. 4. Porosity and thickness of this surface shell layer depends on what lithium compound material is being treated, the acid selected and its concentration, and leaching time. An optimal acid leaching protocol may avoid selective removal of any particular element of the composition (such as only lithium or manganese from NMC). Therefore, the porous surface shell may have substantially the same chemical composition as before acid leaching. As used herein, "substantially the same" means that the chemical composition of the acid treated shell will vary by less than 20%, or less than 10%, for any particular metal component from the chemical composition of the untreated particles. Generally speaking, if the shell chemical composition is unchanged by the acid leaching step, it will be largely the same as the core.

Alternatively, acid leaching of selected compounds may provide the benefit of removing constituents that are otherwise leached into the battery and that disadvantageously increase battery resistance. Accordingly, it is also contemplated that the shell may have a different chemical composition as before acid leaching, and therefore different than the core.

The shell can have a thickness of at least about 10 nanometers, or at least about 50 nanometers, or at least about 2,000 nanometers. The shell can have a thickness of less than about 75% of the particle diameter, or less than about 50% or less than about 25%.

After acid leaching, the particle can be rinsed repeatedly with de-ionized water to remove any chemical residual. Heat treatment can then be performed as necessary to provide a stabilized shell. Moreover, after acid leaching, the porous surface shell may have a reduced mechanical strength and stability. Further, the chemical composition of the shell may not be uniform. Heat treatment can be performed to reduce the surface shell porosity and stabilize the surface porous structure. For example, a mild collapse of the highly porous shell layer can help to stabilize the surface of the particle. In this regard, the average particle size of the material after heat treatment can be at least about 10% smaller than the particle before acid and heat treatment.

A more uniform chemical composition may also be achieved with heat treatment. The optimal heat treatment step includes a selection of temperature, gas environment (nitrogen, argon, or oxygen), and a duration that avoids damaging the particles and/or causing significant particle agglomeration. According to one embodiment, the heat treatment will be between about 100 and 600° C., or between about 200 and 350° C. The heat treatment can be performed for between about 15 minutes and 36 hours, or between about 30 minutes and 6 hours.

In some cases of acid treatment, depending on the combination of reaction temperature, reaction time, acid concentration and mass ratio of lithium metal oxides to acid, lithium may be lost at a higher rate compared to the transitional metals (Ni, Co or Mn). For example it is known that in similar type of materials ($LiNi_xCo_yAl_zO_2$), HCl aqueous solution may preferentially dissolve or remove lithium, resulting in a change of element compositions, such as $Li(1-m)Ni_xCo_yAl_zO_2$ ($0<m<1$). Lithium content loss may result in lower capacity of the treated NMC in a battery device.

It is therefore contemplated that the acid leaching step may be enhanced by the addition of a lithium compound to the acid solution. Moreover, it is believed, without being bound by theory, that the acid leaching treatment may have a preferential removal of lithium from lithium metal oxide compounds. Accordingly, by increasing the presence of Li ions in solution via the addition of a lithium compound, such as lithium iodide, the steady state equilibrium of the system can be influenced such that preferential removal of lithium from the lithium metal oxide particles is reduced.

For example, lithium iodide (LiI) aqueous or organic solution can be used in an aqueous acidic solution to treat the lithium metal oxide powder, according to the following reaction: $mLiI + Li(1-m)(Ni_xCo_yAl_zO_2)O2 \rightarrow Ni_xCo_yAl_zO_2 + (m/2) I_2$. One example is to add an appropriate amount of acid-treated NMCIII into a LiI aqueous solution with a concentration range between 0.01M and 10M at room temperature for a suitable period of time, such as 10 minutes to 10 hours.

One alternative example is to add an appropriate amount of fresh NMCIII into a mixed LiI and acid (HCl, $H_2SO_4$, $H_3NO_3$ etc.) aqueous solution with a concentration of 0.01M-10M and 0.01-10M LiI and acid, respectively, at room temperature for a suitable period of time, such as 3 minutes to 3 hours.

Lithium inclusive compounds such as lithium oxide, lithium permanganate, lithium chromate dehydrate, lithium sulfate, lithium phosphate, lithium dichromate, lithium carbonate, lithium hydrogen phosphate, dilithium sulfite, lithium sulfate monohydrate, lithium bromate, lithium thiocyanate, lithium hydrogen carbonate, lithium chloride, lithium iodate, lithium hydroxide, lithium iodide, lithium chomate, lithium sulfide, lithium bromide, lithium nitrde, lithium oxalate, lithium nitrate, lithium fluoride, lithium chlorite, lithium hydrogen sulfate, lithium hypobromite, lithium nitrate monohydrate, lithium chlorate, lithium phosphide, lithium thiosulfate, are also considered suitable.

With combined acid leaching and heat treatment, primary particles with porous surfaces and solid cores can be engineered and optimized. These porous shell and solid core particles can have the same chemical composition. If performed properly, no significant change of size and/or size distribution of either primary particles or secondary particles will occur. A much larger contact surface area with electrolyte, which enables a faster Li transport rate.

COMPARATIVE EXAMPLE

Figure 6:
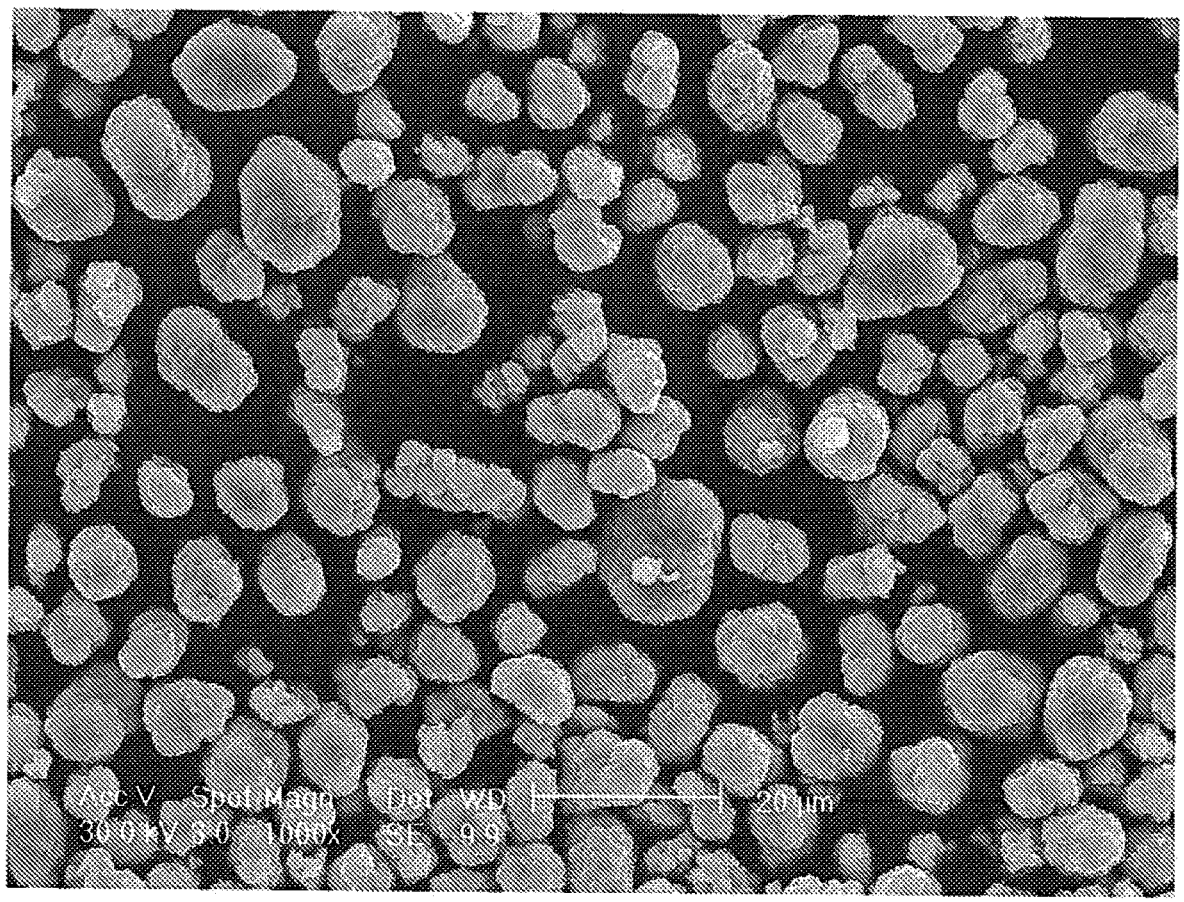
FIG. 6 is an SEM image of NMC111 after 0.05M $H_3PO_4$ treatment for 2.5 hours at room temperature.
Figure 7:
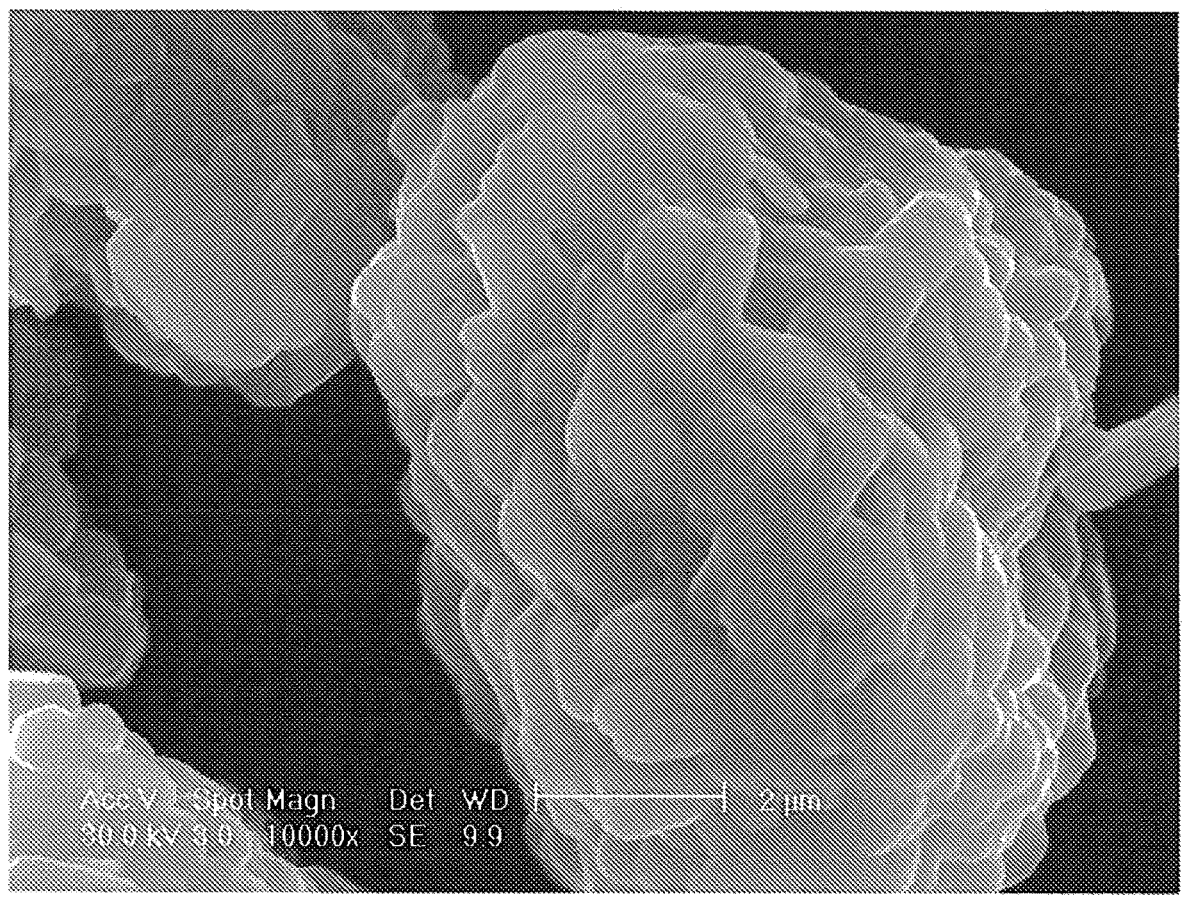
FIG. 7 displays the surface morphology of the treated NMC111 material of FIG. 6 via SEM imaging.

At room temperature, a quantity of 4.7 grams Li(Ni1/3Mn1/3Co1/3)$O_2$ (NMC) commercial powder (purchased from MTI corporation) was added into 50 ml of a 0.05M $H_3PO_4$ acid aqueous solution. A magnetic stirring bar was used for slow mixing. After 2.5 h of acid treatment, the mixture was transferred into a centrifuge tube for solid-liquid separation for 5 minutes at 4000 rpm. Top clear solution in centrifuge tubes became more reddish in color with a longer period of acid treatment. Deionized (60 ml) was added into the centrifuge tube, and the settled remaining solids were re-dispersed in the deionized water by hand-shaking. The top clear solution was removed after centrifugation. The processes of deionized water washing and centrifuge separation were repeated for total three times. Then dry the remaining solids in a glass dish at 110° C. on a hot plate for 2-3 hours without further heat treatment. A Philips XL30 FEG Scanning Electron Microscope (SEM) was applied to observe any changes of particle morphology after acid treatment. From FIGS. 6 and 7 show the images of NMC after 2.5 h of 0.05M $H_3PO_4$ treatment. FIG. 6 shows the particle sizes did not decrease after treatment. FIG. 7 shows primary particle surface remained smooth as the virgin particles Energy dispersive spectroscopy (EDS) was also applied to measure the Mn:Co:Ni atomic ratios. The $H_3PO_4$ treated NMC had a ratio of 0.92:0.90:1.0 compared to a ratio of 0.98:0.91:1.0 of fresh powder. There is a slight Mn preferential loss observed, which is similarly observed in the samples treated by 2M HCl aqueous solution described below.

Example 1

At room temperature, a quantity of 2.13 grams Li(Ni1/3Mn1/3Co1/3)$O_2$ (NMC) commercial powder (purchased from MTI corporation) was added into 50 ml of a 2M HCl acid aqueous solution. A magnetic stirring bar was used for slow mixing. After a various period of acid treatment (from minutes to hours), the mixture was transferred into a centrifuge tube for solid-liquid separation for 5 minutes at 4000 rpm. Top clear solution in centrifuge tubes became more reddish in color with a longer period of acid treatment. Deionized water (60 ml) was added into the centrifuge tube, and the settled remaining solids were re-dispersed in deionized water by hand-shaking. The top clear solution was removed after centrifugation. The processes of deionized water washing and centrifuge separation were repeated for total three times. Then dry the remaining solids in a glass dish at 110° C. on a hot plate for 2-3 hours without further heat treatment.

Figure 8:
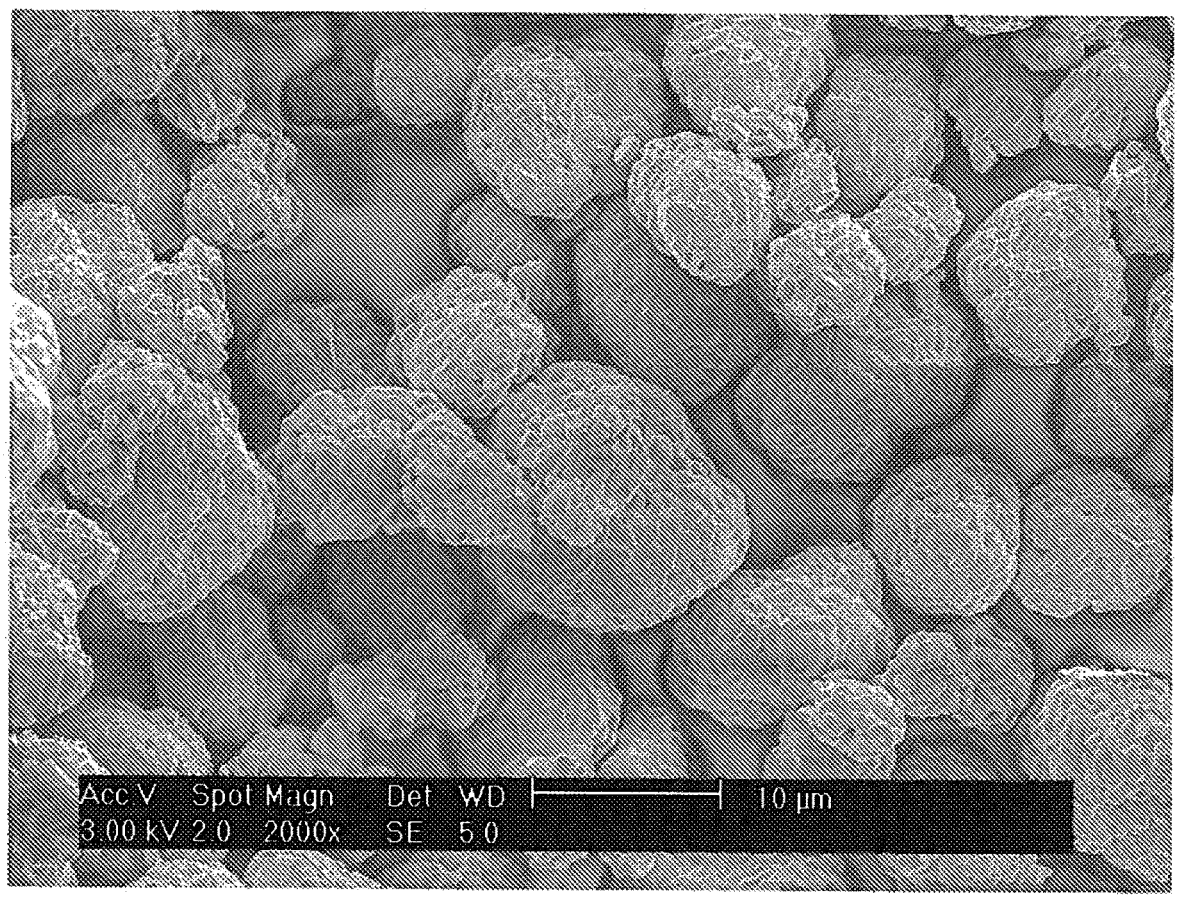
FIG. 8 is an SEM image of virgin NMC111 before any acid treatment and heat treatment (average 10 micron)
Figure 9:
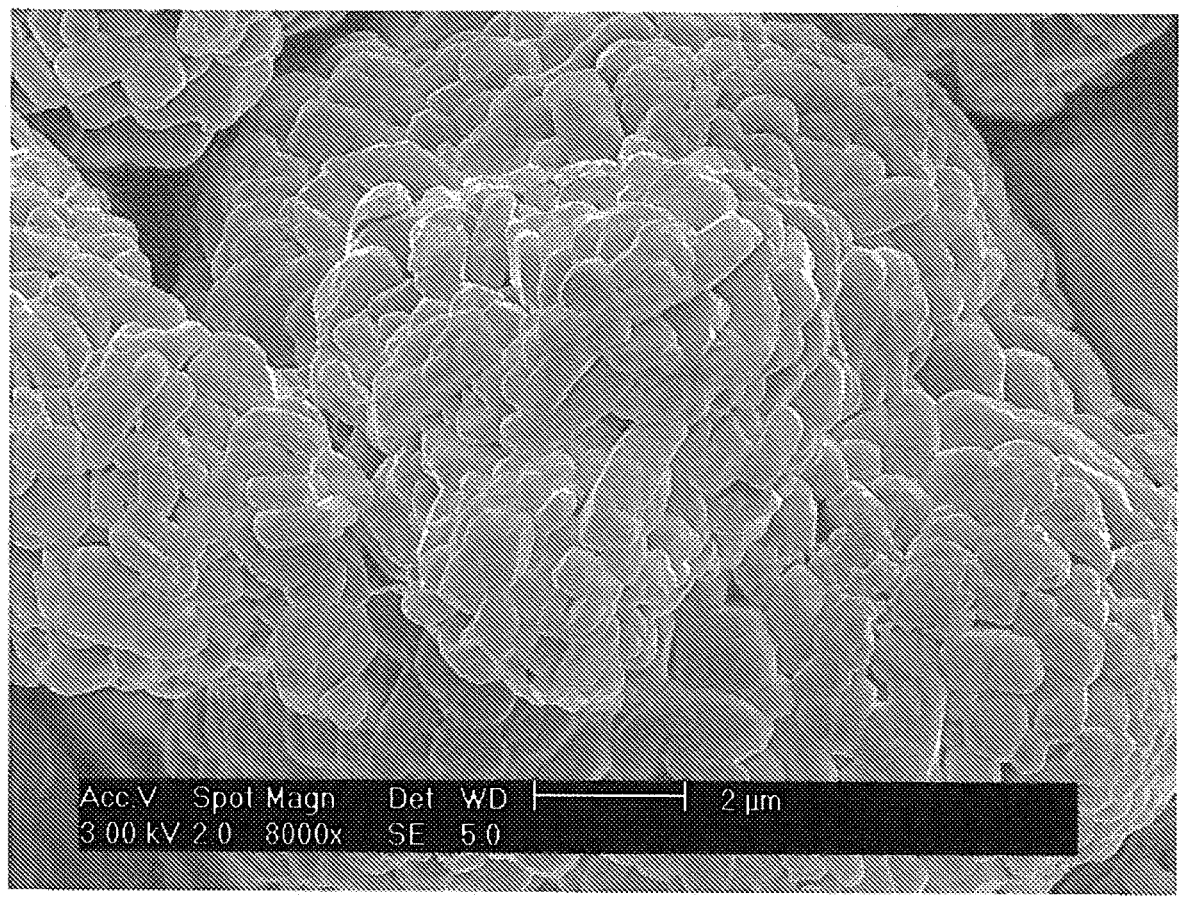
FIG. 9 is an SEM image of virgin NMC111 primary particles within an aggregated secondary particle.
Figure 10:
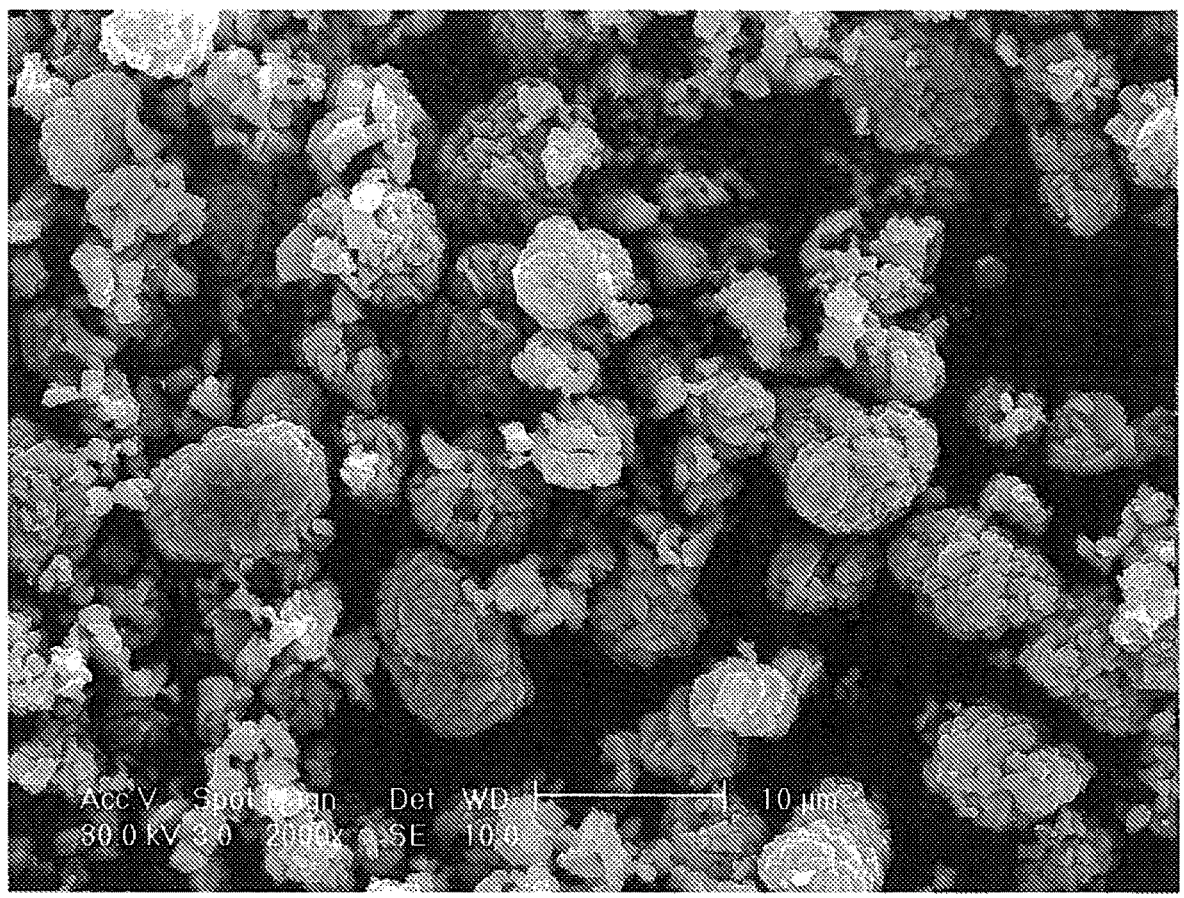
FIG. 10 an SEM image of is NMC111 after 10 minutes of 2M HCl treatment and 3 hours of heat treatment at 110° C.
Figure 11:
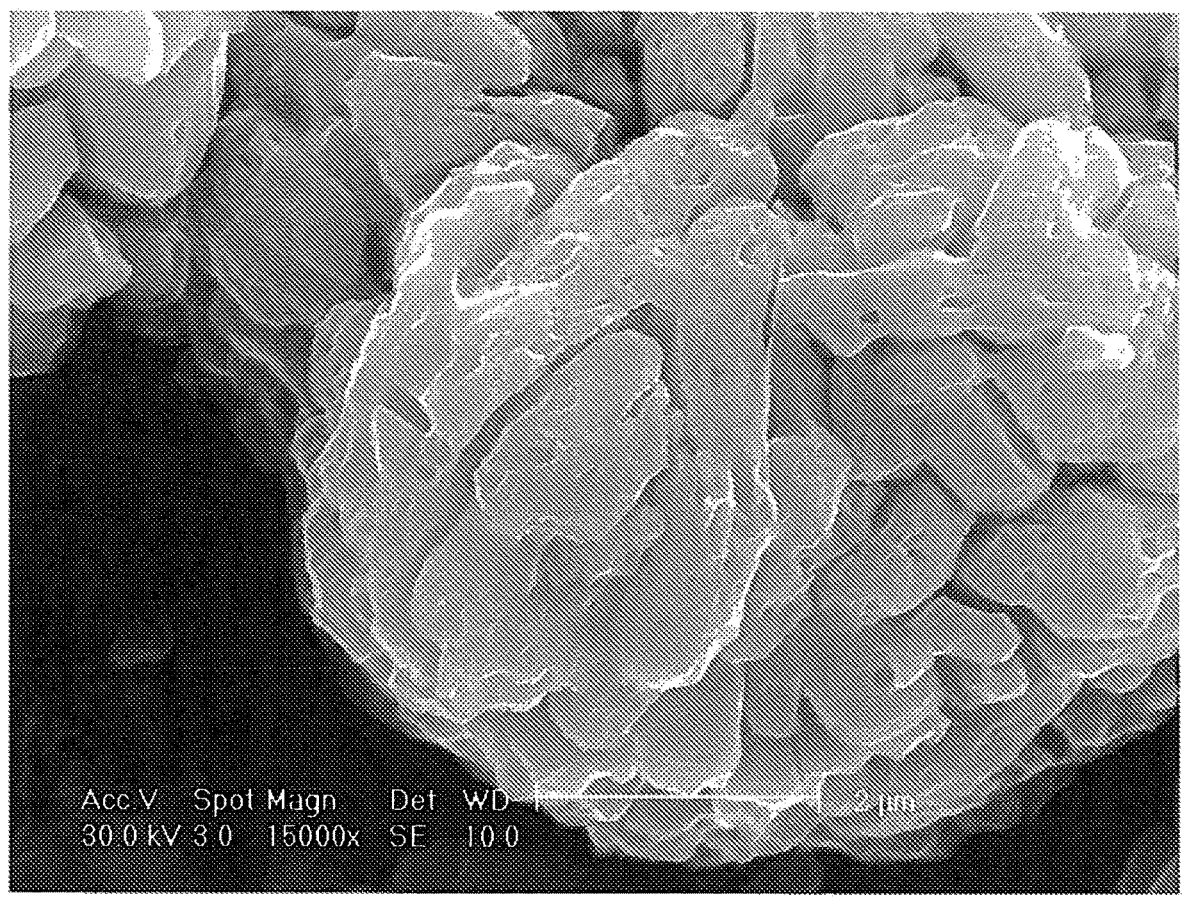
FIG. 11 an SEM image of is NMC111 after 10 minutes of 2M HCl treatment and 3 hours of heat treatment at 110° C.
Figure 12:
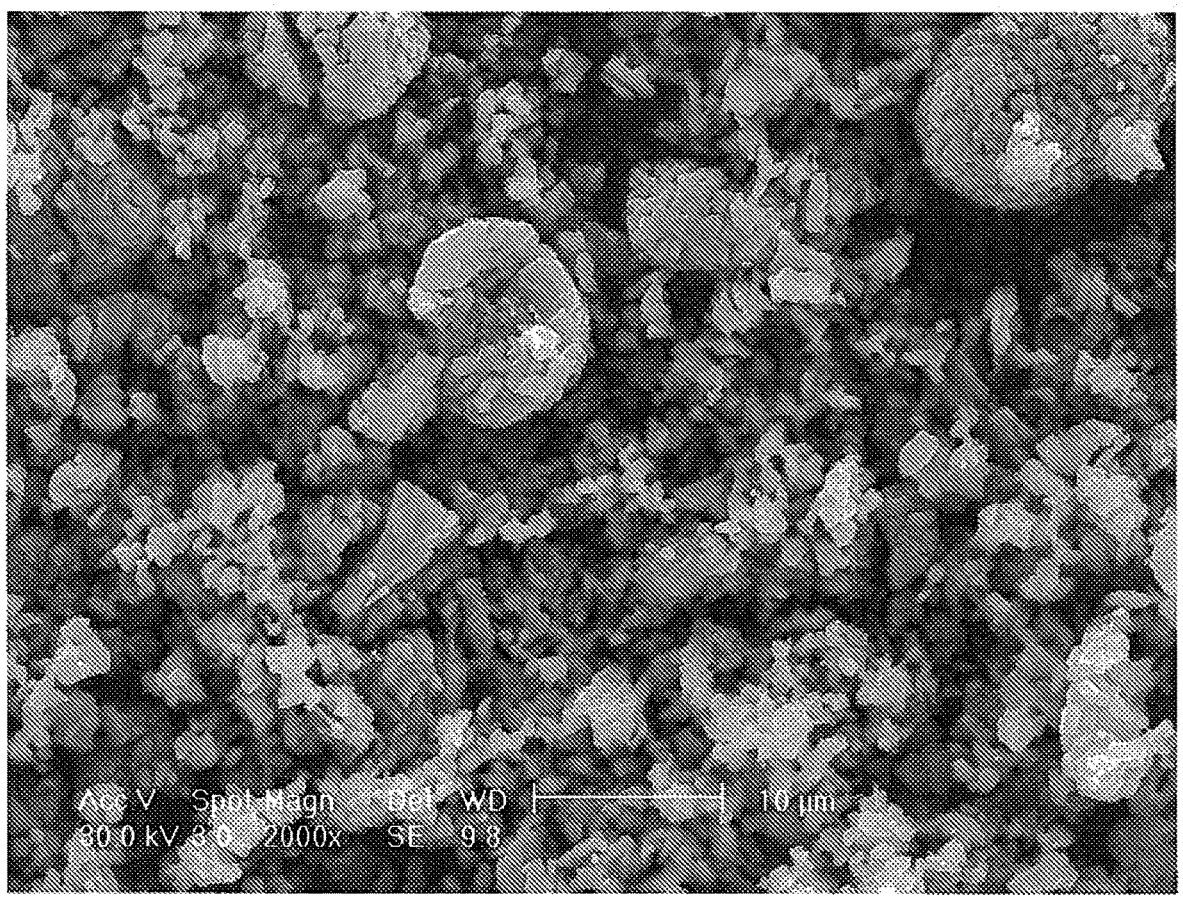
FIG. 12 an SEM image of is NMC111 after 30 minutes of 2M HCl treatment and 3 hours of heat treatment at 110° C.
Figure 13:
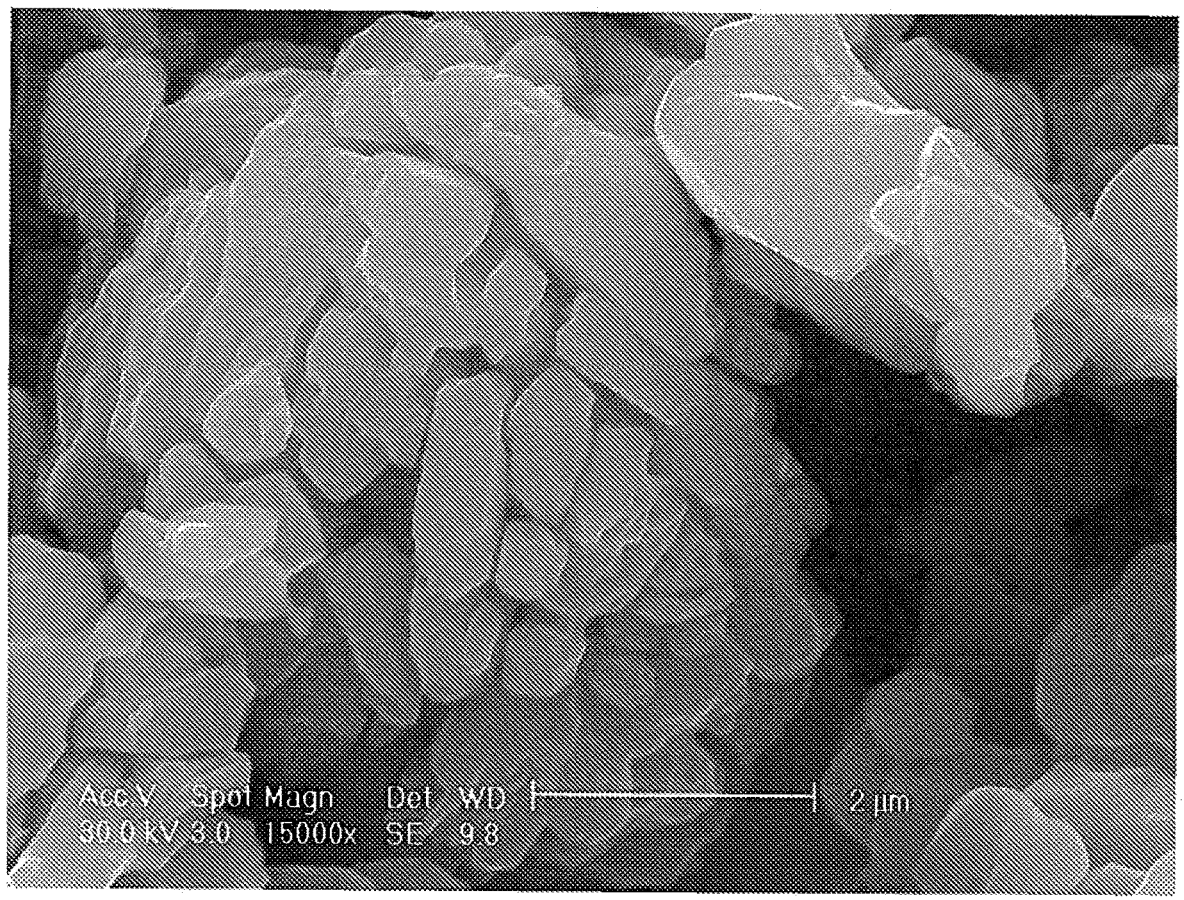
FIG. 13 an SEM image of is NMC111 after 30 minutes of 2M HCl treatment and 3 hours of heat treatment at 110° C.
Figure 14:
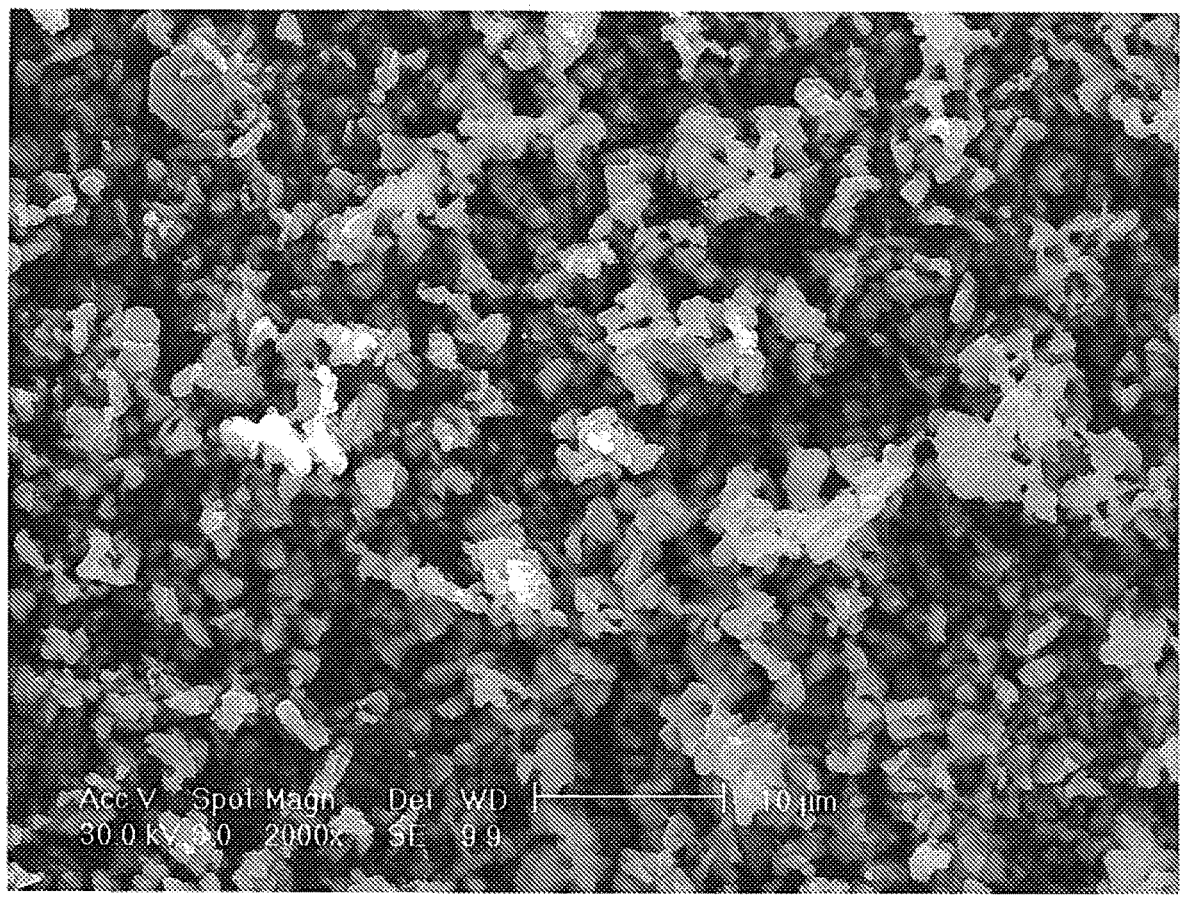
FIG. 14 an SEM image of is NMC111 after 2 hours of 2M HCl treatment and 3 hours of heat treatment at 110° C.

A Philips XL30 FEG Scanning Electron Microscope (SEM) was applied to observe any changes of particle morphology after acid treatment. From FIGS. 8 and 9, virgin NMC particles have an average particle size of 10 microns. FIG. 9 shows the smooth surface of the primary particle surface within an agglomerated secondary particle. FIGS. 10 and 11 show the images of NMC after 10 minutes of 2M HCl treatment. FIG. 10 shows the particle sizes decreased after treatment. FIG. 11 shows primary particle surface became porous, and primary particles were more separated from each other within a secondary particle. After 30 minutes of acid treatment as shown in FIGS. 12 and 13, particle size dramatically decreased. After 2 hours of acid treatment, almost all spherical secondary particles were disintegrated into non-spherical shaped smaller particles as shown in FIG. 14.

Figure 15:
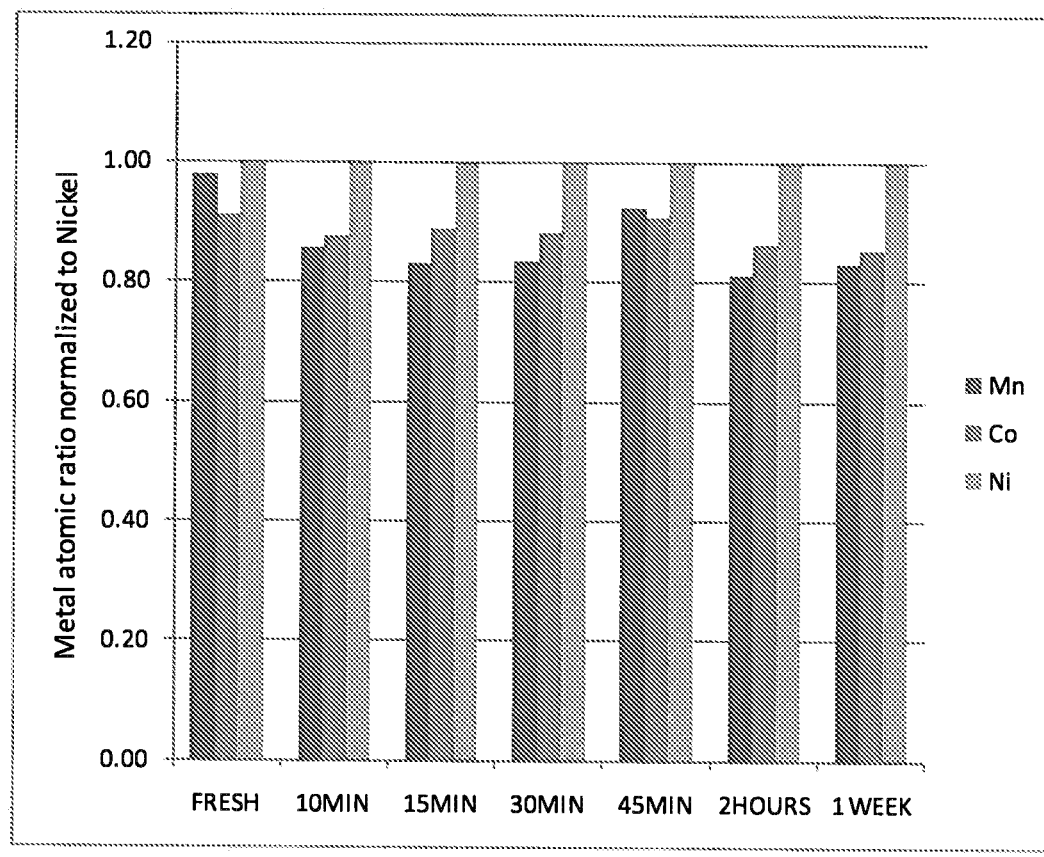
FIG. 15 is a graphical depiction of Mn and Co relative atomic ratios to Ni for virgin and various periods of acid-treated (2M HCl, 3 h 110° C. heat treatment) samples.

Energy dispersive spectroscopy (EDS) was also applied to measure the Ni:Co:Mn atomic ratios. From FIG. 15, slightly Mn preferential loss was observed. However, with the increase of acid treatment duration, Mn content stayed relatively constant.

Example 2

A lithium battery cell is constructed to include a cathode, an anode, a separator layer, and an electrolyte solution. The cathode includes a mixture of active cathode material, a binder such as PVDF, and a carbon additive such as Timcal Super C65. The active cathode material is prepared by a method including the steps of:

(A) submerging about 20 grams of powdered NMC in 200 milliliters of a 1M solution of hydrochloric acid and stirring the solution at room temperature for 20 minutes;

(B) removing the NMC by filtration, rinsing the removed NMC with deionized water; and (C) heating the rinsed NMC at 250° C. for 20 minutes.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A cathode material comprising:
    an agglomerated plurality of lithium inclusive particles;
    wherein each particle of said plurality of lithium inclusive particles includes a core surrounded by a shell, said shell being more porous than said core and comprising a lithium compound material, said lithium compound material comprising a lithium-containing compound, wherein said core comprises the same lithium compound material as said shell, and wherein said lithium compound material comprises lithium nickel manganese cobalt oxide (NMC).

2. The cathode material of claim 1 wherein said particles are substantially non-spherical.

3. The cathode material of claim 1 wherein said particles have an average size of less than about 50 microns.

4. The cathode material of claim 1 wherein said shell comprises a Ni:Co:Mn atomic ratio wherein Ni>Co>Mn.

5. The cathode material of claim 1 wherein the shell comprises less than 50% of the particle diameter.

6. The cathode material of claim 5 wherein the shell comprises less than about 25% of the particle diameter.

7. The cathode material of claim 1 wherein said core comprises a Ni:Co:Mn atomic ratio of substantially Ni=Co=Mn.

8. A battery including the cathode material of claim 1.

9. An automotive vehicle including the battery of claim 8.

10. A method of manufacturing a lithium battery comprising:
    providing a lithium material compound in the form of an agglomerated plurality of lithium inclusive particles;
    exposing the plurality of lithium inclusive particles to an acid solution for a time period sufficient to form a shell characterized by a plurality of pores within a surface of each particle of said plurality of lithium inclusive particles, wherein the shell surrounds a solid core and is more porous than the core;
    heat treating said plurality of particles; and
    assembling said plurality of particles as a cathode of a battery;
    wherein the shell comprises a lithium compound material, the lithium compound material comprising a lithium-containing compound, and the core comprises the same lithium compound material as the shell, and wherein the lithium compound material comprises lithium nickel manganese cobalt oxide (NMC).

11. The method of claim 10 wherein said acid solution comprises one of HF, $H_2SO_4$, $HNO_3$, and HCl.

12. The method of claim 11 wherein said particles are exposed to said acid solution for at least 10 minutes.

13. The method of claim 10 wherein said acid solution includes a lithium compound.

14. The method of claim 10 wherein said particles are exposed to a solution including a Li compound after said acid treatment.

15. The method of claim 10 wherein said heat treating comprises heating said particles to at least 100° C.

16. The method of claim 12 wherein said acid solution includes a molar mass of acid solute of greater than about 0.1M.

17. The method of claim 10 wherein said particles, before exposure to said acid solution, have an average particle size greater than one micron, and, after exposure to said acid solution, have an average particle size of less than one micron.

18. A cathode material of claim 1, wherein each said particle has a particle size of less than about 50 microns and said shell has a shell thickness of less than about 75% of the particle size.

\* \* \* \* \*